No. 784,796. PATENTED MAR. 14, 1905.
W. H. LAWRENCE.
MILKING APPARATUS.
APPLICATION FILED MAY 24, 1904.

No. 784,796. PATENTED MAR. 14, 1905.
W. H. LAWRENCE.
MILKING APPARATUS.
APPLICATION FILED MAY 24, 1904.

Witnesses:
Wm. A. Barr
Titus N. Drans

Inventor:
William H. Lawrence.
by his Attorneys,
Howson & Howson

No. 784,796. PATENTED MAR. 14, 1905.
W. H. LAWRENCE.
MILKING APPARATUS.
APPLICATION FILED MAY 24, 1904.

Witnesses:

Inventor:
William H. Lawrence,
by his Attorneys,

No. 784,796. PATENTED MAR. 14, 1905.
W. H. LAWRENCE.
MILKING APPARATUS.
APPLICATION FILED MAY 24, 1904.

Witnesses:
Inventor:
William H. Lawrence.
by his Attorneys,

No. 784,796. PATENTED MAR. 14, 1905.
W. H. LAWRENCE.
MILKING APPARATUS.
APPLICATION FILED MAY 24, 1904.

Witnesses:
Wm. A. Barr
Titus N. Irons.

Inventor:
William H. Lawrence.
by his Attorneys,
Howson & Howson

No. 784,796. Patented March 14, 1905.

UNITED STATES PATENT OFFICE.

WILLIAM HENRY LAWRENCE, OF GLASGOW, SCOTLAND.

MILKING APPARATUS.

SPECIFICATION forming part of Letters Patent No. 784,796, dated March 14, 1905.

Application filed May 24, 1904. Serial No. 209,590.

*To all whom it may concern:*

Be it known that I, WILLIAM HENRY LAWRENCE, engineer, a subject of the King of Great Britain, and a resident of 35 Melville street, Pollokshields, Glasgow, Scotland, have invented certain new and useful Improvements in Milking Apparatus, of which the following is a specification.

This invention relates to cow and other animal milking apparatus of the pneumatic pulsating type, such as set forth in the prior United States Letters Patent, No. 642,044, dated January 23, 1900; No. 628,338, dated July 4, 1899; No. 646,183, dated March 27, 1900, and No. 756,245, dated April 5, 1904. The nature and construction of such apparatus is fully set forth in said prior patents, and it will therefore only be necessary in my present specification to refer to such parts of the apparatus as may be necessary for the full and clear understanding of my present invention.

The object of my present invention is by various improved means to adapt or modify the aforesaid apparatus of the pneumatic pulsating type, so that the process of milking may be carried on under various methods and with what may be termed "double chambered" and also "single-chambered" teat-cups.

Of course, if so desired, the features of my present invention may, where suitable, be used in conjunction with other known forms of pulsating mechanism.

In order that my invention may be properly understood, I have hereunto appended sheets of drawings, and in these drawings examples of the improved means or apparatus are shown in a form suitable for placing on the milk receptacle or pail and for milking two animals simultaneously, although, of course, the apparatus can be adapted so as to milk one or more than two cows simultaneously and be placed or fitted in any other suitable position.

On the drawings the same reference letters and numerals wherever repeated indicate the same or similar parts.

Figures 1 to 5 show one construction of the apparatus, Fig. 1 being an end elevation, Fig. 2 a plan, Fig. 3 a back elevation and section through A A, Fig. 2; Fig. 6 is a vertical section of an inspection device, and Fig. 7 a section through the cock thereof. Figs. 24 to 28 show vertical sections of various forms of double-chambered teat-cups, while Fig. 29 is a cross-section on the line D D, Fig. 28.

It may be here stated that the double-chambered teat-cups illustrated are of improved construction and may be divided into two classes A and B.

Class A. Those in which both the outer case and the inner lining are made flexible, so as to be transformable and to close in and open out with the variations of vacuum or pneumatic pressure produced in the cup. (See Fig. 25.)

Class B. Those in which the outer case is rigid, while the inner lining is made elastic, so as to expand and contract under the fluctuations of vacuum or pneumatic pressure. (See Figs. 24, 26, 27, 28, and 29.)

It may be also stated that there are three principal methods by which the milking process can be carried on with the apparatuses— namely:

By method No. 1, which consists in effecting variations of pneumatic pressure in the outer teat-cup chamber only by alternate admission of vacuum from supply and air from the milk-receptacle, (or from the vacuum-supply and atmosphere,) while the inner chamber of the cup is in constant communication with the milk-receptacle. In both cases air is admitted into the milk conductor or claw at the junction of the teat-cups through a restricted opening preferably controlled by a valve or valves, and the degree of vacuum in the milk-receptacle is controlled by means of a vacuum-reducing valve.

By method No. 2, under which the pulsating apparatus is constructed to operate two sets of ports and passages communicating with the outer and inner chambers of the teat-cups. The pulsations are arranged to be approximately simultaneous in the inner and outer chambers when using the A class of teat-cup, while they are arranged approximately alternate when using the B class. In one form the apparatus for carrying out this method may be constructed so that the main pulsator piston or valve which operates one set of passages can be made to actuate another pulsating valve serving another set of passages. These passages may be connected to the inner and outer chambers of the teat-cups, respectively, or when used with single-chambered teat-cups each of the two branches on either side of the machine may be connected to one pair of teat-cups, so that the pulsations can be effected alternately in each pair for the same animal.

By method No. 3, under which modifications of the differential type of pulsating apparatus set forth in the United States Patent No. 642,044, of 1900, can be employed. In one form the apparatus is so arranged that the movement of the pulsator-piston is controlled by the fluctuations of the vacuum and pressure which it effects in the teat-cups. When the apparatus is used with single-chambered teat-cups, the pulsating device is arranged to partially cut off the communication between the milk-pipe and the milk-receptacle, while the air is delivered from the pulsating device through a separate pipe to the junction piece or claw of the teat-cups. When used for double-chambered teat-cups, the milk-pipe is connected to the milk-receptacle by one pipe, while another pipe serves to supply vacuum and air alternately to the outer teat-cup chambers.

I will now proceed to fully describe the various apparatuses employed in carrying out my invention.

Figure 1:
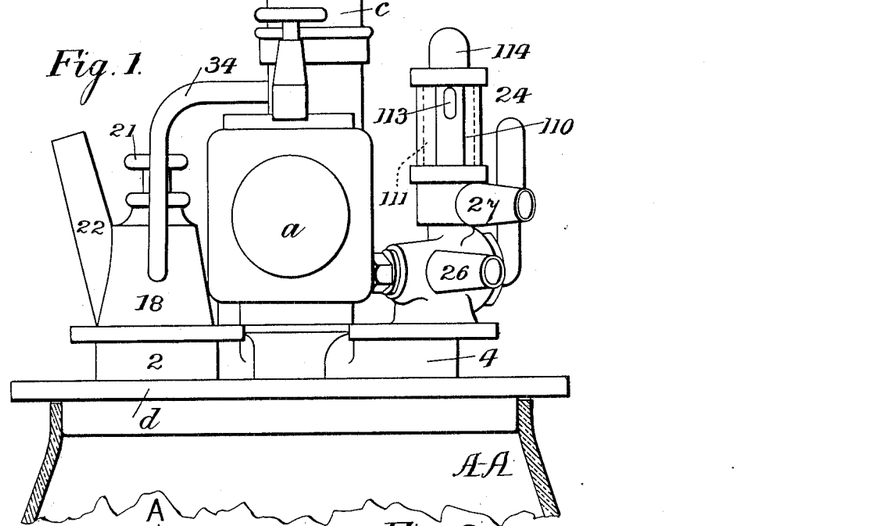
Figure 2:
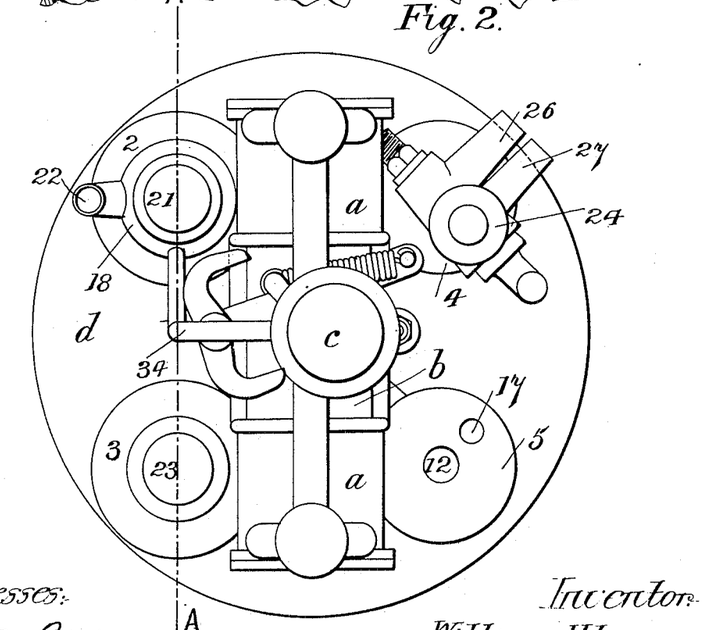
Figure 3:
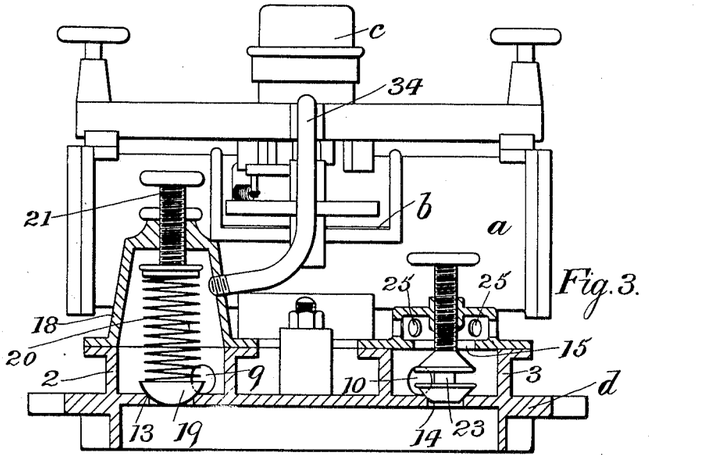
Figure 4:
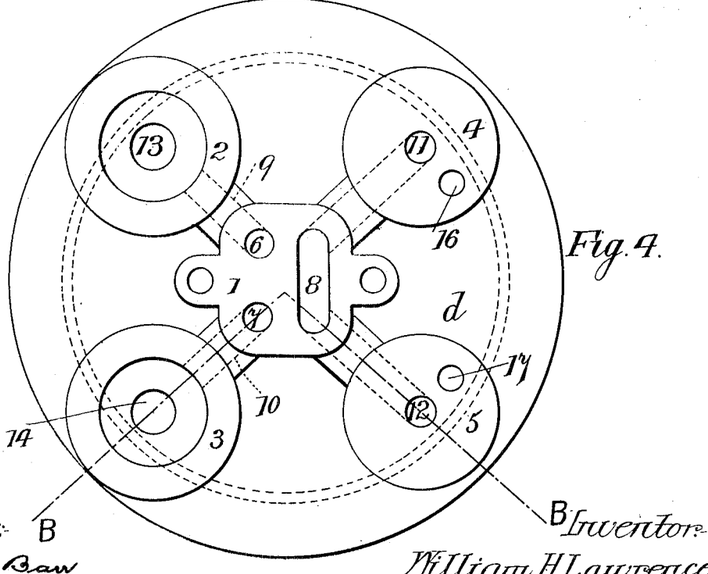
Fig. 4, a plan of the base-plate drawn in relation to Fig. 2.
Figure 5:
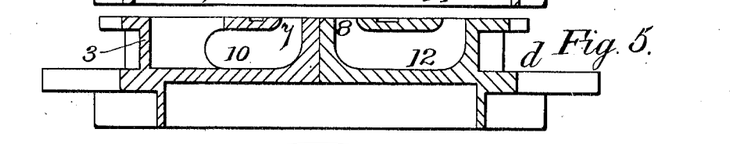
Fig. 5 a section on the line B B, Fig. 4.

The apparatus illustrated in Figs. 1 to 5 is adapted for double-chambered teat-cups operated according to the first method; and it comprises a pulsating cylinder $a$ and piston $b$, with its oscillating valve $c$, all substantially similar to the same parts described in the United States Patent No. 756,245, dated April 5, 1904. This pulsating apparatus is mounted on a base $d$, which serves as a cover for the milk-receptacle A A and which is arranged with ports and passages communicating with the branches leading to the teat-cups by way of special inspection devices, the vacuum-supply, and the air-supply. The base plate or cover $d$ is made with five stools or seats, stool 1 serving for the attachment of the pulsator-cylinder $a$, stool 2 for the vacuum-reducing valve, stool 3 for the air-supply, and stools 4 and 5 for the inspection devices and duplex stop-cocks. From the ports 6, 7, and 8 in the stool 1 passages 9, 10, 11, and 12 lead to the stools 2, 3, 4, and 5. From the stool 2 the port (or valve-seat) 13 leads to the milk-receptacle, from the stool 3 the ports (or valve-seats) 14 and 15 lead to the milk-receptacle and the atmosphere, respectively, and from the stools 4 and 5 the ports 16 and 17 lead to the interior of the milk-receptacle. The valve-case 18 contains a reducing-valve 19, which is loaded with the spring 20, regulatable by the screw 21. The nozzle 22 serves for connecting the case 18 to the vacuum-supply pipe. (Not shown.) The screw three-way valve 23 when closed against the upper seat 15 connects port 7 with the milk-receptacle and when closed against the lower seat 14 connects the same port with the atmosphere through the openings 25 in accordance with method No. 1. The nozzles 26 27 of the inspection devices 24 (one device only is shown at Fig. 2) are connected by flexible pipes to the conductors 28 and 29 of the junction piece or claw, Fig. 8, or the conductors 31 30 of the claw, Fig. 9, according as the air for producing pulsations in the outer teat-cup chambers is supplied from the atmosphere through the valve-seat 15 or from the milk-receptacle through the valve-seat 14.

Figures 6, 7:
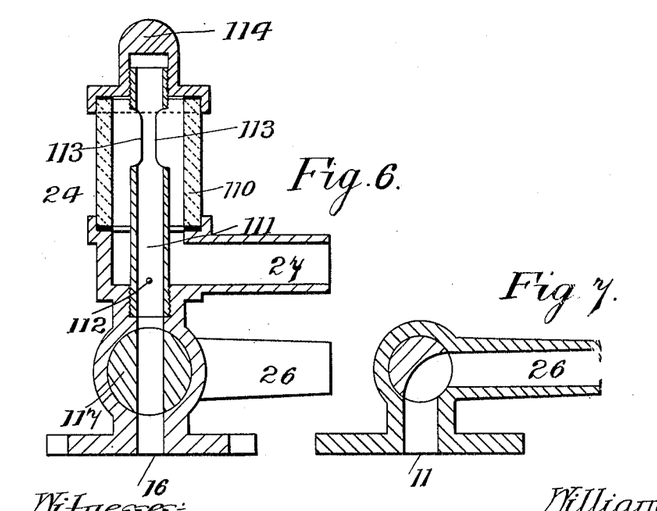

The operation of this milking apparatus according to method No. 1 and with the air-supply through the valve-seat 15 is as follows: Presuming the cavity $90^a$ (see Fig. 13) of the reciprocating pulsator-piston $b$ is over the port 6 and cavity 8, then vacuum is supplied through the nozzle 22 of the reducing-valve chest 18, passage 9, and port 6 to the cavity $90^a$ of the pulsator-piston, and then to the cavity 8 in the stool No. 1, and thence by the passages 11 and 12 through the nozzles 26 of the inspection devices, one of which is shown at Fig. 6, to each conductor 28 of the claw, Fig. 8, and so by the claw branches 32 to the outer chambers of the teat-cups and opens or dilates the inner linings thereof. Vacuum of a reduced degree, according to the tension of the spring 20 of the reducing-valve 19, also has access, by way of the milk-receptacle ports 16 17 and nozzles 27, to the conductors 29 and their branches 33 of each claw to the inner teat-cup chambers or linings. When the pulsator-piston $b$ is moved by the action of the vacuum supplied through the pipe 34 to the other end of its stroke, so as to bring the cavity 90ª of the piston over the port 7 and cavity 8, then air can flow through the apertures 25 and valve-seat 15 to the passage 10 and port 7 and then through the piston-cavity 90ª, cavity 8, nozzles 26 to the outer teat-cup chambers, and this causes the inner lining of each teat-cup, by the action of the internal vacuum, to contract or close on the animal's teat and force the milk out of the teat into the conductor 29 of the claw, from whence it passes to the milk-receptacle and is forced along the milk-tube by a certain amount of air which passes from the outer teat-cup chamber through the valve 35 of the claw, Fig. 8, and passage 34 into the conductor 29. These operations are repeated automatically by the movements of the pulsator-piston, which reciprocates under the variations of pneumatic pressure in the manner fully set forth in the prior United States Patent, No. 756,245, of 1904.

Figure 8:
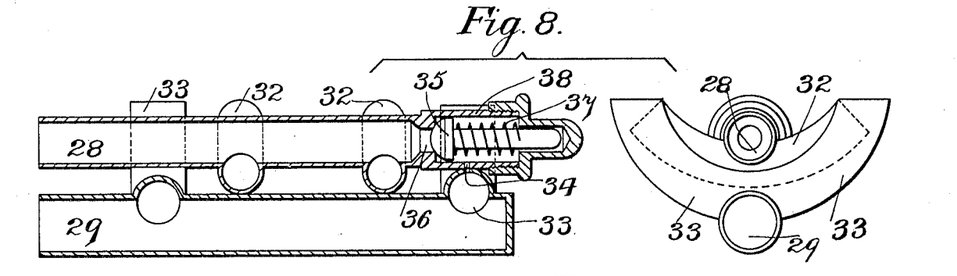
Fig. 8 is a longitudinal section and an end view of a "claw.

A special function of the valve 35 of the claw, Fig. 8, is to supply a restricted amount of air to the milk-conductor 29 at the periods when the pressure in the outer teat-cup chamber expels the milk from the teat into the inner chamber or lining, and so assists the flow of milk to the milk-receptacle. The valve is preferably constructed, as shown, with a spheroidal face which closes against a seat 36 at the end of the conductor 28 by the action of a spring 37. The head of the valve is cylindrical and forms a piston which works in the chest 38; but the piston is so arranged that it will pass a limited amount of air, either by clearance or passages from the air-conductor 28, into the milk-conductor 29 through the aperture 34. The seat 36 is of a smaller area than the piston, so that immediately the air-pressure in the conductor 28, acting in conjunction with the vacuum in the conductor 29, overcomes the resistance of the spring 37 the valve 35 will automatically open and will remain open until sufficient vacuum is again formed in the conductor 28. The movements of the valve will synchronize with the movements of the pulsator-piston.

Figure 9:
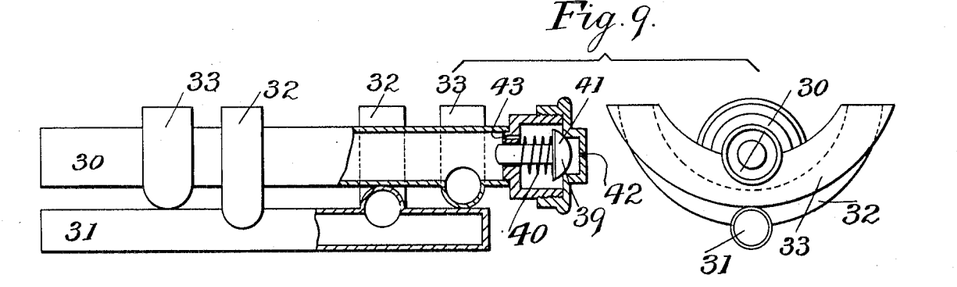
" Fig. 9 is a part side elevation and section and an end view of another claw.

When the air-supply for the outer teat-cup chamber is taken from the milk-receptacle through the valve-seat 14, the claw, Fig. 9, is employed. This claw is provided with a valve 39, which is capable of opening inward and is held by the spring 40 against its seat 41 in the cover, in which there is an aperture 42 of restricted area communicating with the atmosphere. The pressure of the spring 40 is such that the valve 39 will remain open under the influence of the vacuum in the milk-conductor 30 and the pressure of the external atmosphere so long as the degree of vacuum exceeds a predetermined maximum degree, but will close again as soon as this degree of vacuum is reduced. The air admitted through the opening 42 when the valve is opened passes by the passage 43 to the interior of the milk-conductor 30 and propels the milk into its receptacle and is then made to pass intermittently by the movement of the pulsator-piston through the outer teat-cup chambers to the vacuum-nozzle 22 and is carried away by the vacuum-pipe.

Figure 17:
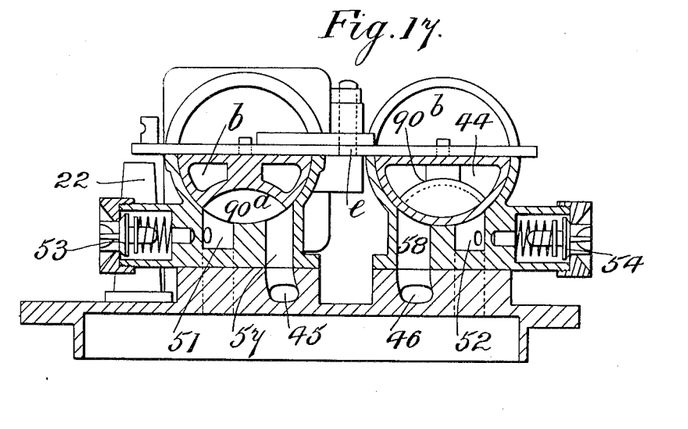
Fig. 17 is a cross-section on the line C C, Fig. 18.
Figure 18:
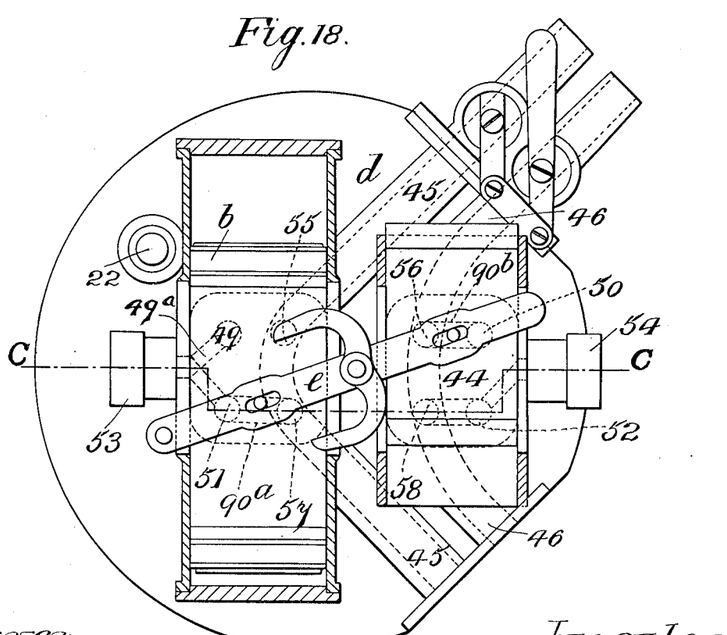
Fig. 18 is a plan of a fourth construction of the apparatus.
Figure 22:
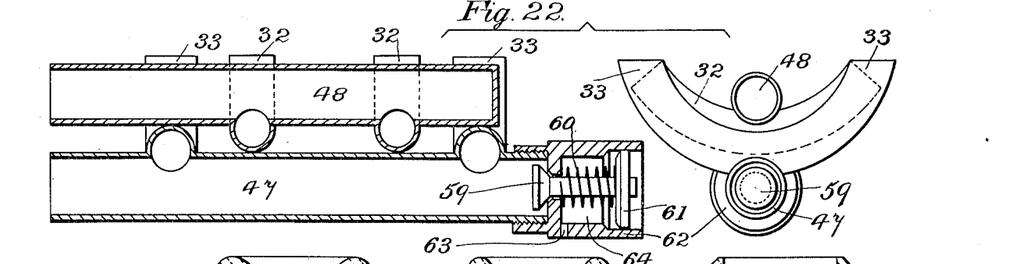
Fig. 22 is a longitudinal section and an end view of a claw.

Under method No. 2, when working with either single or double chambered teat-cups, a modification of the apparatus described in the United States Patent No. 756,245, of 1904, may be employed. Under this modification the pulsating mechanism is duplicated in the manner illustrated at Figs. 17 and 18. The main pulsator piston or valve $b$ is made and operated in substantially the same manner as described in the aforesaid United States Patent and is by means of the pendulum lever $e$ made to operate another pulsating-valve 44. The ports 49 and 50 (indicated in dotted lines at Fig. 18) communicate with the milk-receptacle and the vacuum-supply 22, the ports 51 and 52 communicate with the air-admission valves 53 and 54, and the ports 55 57 and 56 58 communicate with the branches 45 and 46, respectively. The oscillating piston or valve $b$ (which has the transverse cavity 90ª) establishes by the cavity 90ª communication between the vacuum-port 49 and port 55 at one end of the stroke of the piston $b$ and between the air-port 51 and port 57 at the other end of the stroke and in this manner controls the vacuum and air supply to the branches 45, while the valve 44 (which has a transverse cavity 90ᵇ) in the same manner through its cavity 90ᵇ establishes communication between the vacuum-port 50 and port 56 at one stroke and between the air-port 52 and port 58 at the next return stroke, and thereby controls the vacuum and air supply to the branches 46. When using double-chambered teat-cups, each branch 46 is connected to the milk-conductor 47 of a claw such as shown at Fig. 22, and which conductor communicates, by means of the branches 33, with the inner chambers of the teat-cups, while each branch 45 is connected to the air-conductor 48 of the claw, which latter communicates, by means of the branches 32, with the outer teat-cup chambers. The pulsating valves $b$ and 44, which in this arrangement move in opposite directions by the oscillation of the pendulum lever $e$, cause the vacuum and air supply in the inner and outer chambers of the teat-cups to alternate periodically. When single-chambered teat-cups are used with this form of apparatus, two cups in each set of four are connected to the branches 45 and 46, which produces as a result the contraction of one pair of cups simultaneously with the expansion of the other pair. When the A type of teat-cup is used with this method of milking, the ports are so arranged that the vacuum and air supply to the inner and outer teat-cup chambers is approximately simultaneous instead of alternate. Thus the port 49 may be made to communicate only with the valve 53 by a passage, (indicated in dotted lines at 49ª,) while the passage 51 instead of communicating with the valve 53 is made to communicate with the interior of the milk-pail. The claw, Fig. 22, which can be used in conjunction with this arrangement, has a valve 59 connected with the milk-conductor 47. This valve, which is of a special type, consists practically of two valves and seats of different areas and so arranged that when one valve is on its seat the other valve is off, and vice versa. In its normal position the lesser valve 59, which communicates with the milk-conductor 47, is closed against its seat by the action of the spring 60, while the larger valve 61 is kept off its seat and is open to the atmosphere and acts as a piston in the cylinder 62. An aperture 63, which may be provided with means for regulating its area, communicates with the space 64 between the two valves. The spring 60 is so adjusted that the vacuum in the conductor 47 when near its maximum in conjunction with the atmosphere in the space 64 draws the valve 59 off its seat, and as a consequence there is a suction created in the space 64 which becomes effective upon the larger area of the valve 61 and closes it against its seat. Air can now flow freely through the aperture 63 into the conductor 47 until the vacuum therein is so reduced that the combined effect of the vacuum upon the two valves 59 61 is less than the resiliency of the spring, whereupon the valve automatically returns to its original position. The areas of the valves 59 and 61 are so proportioned as to give the desired reduction of vacuum in the conductor 47.

Instead of using two pulsating pistons or valves one only may be used, and in this case the two sets of ports would be arranged accordingly.

Figure 10:
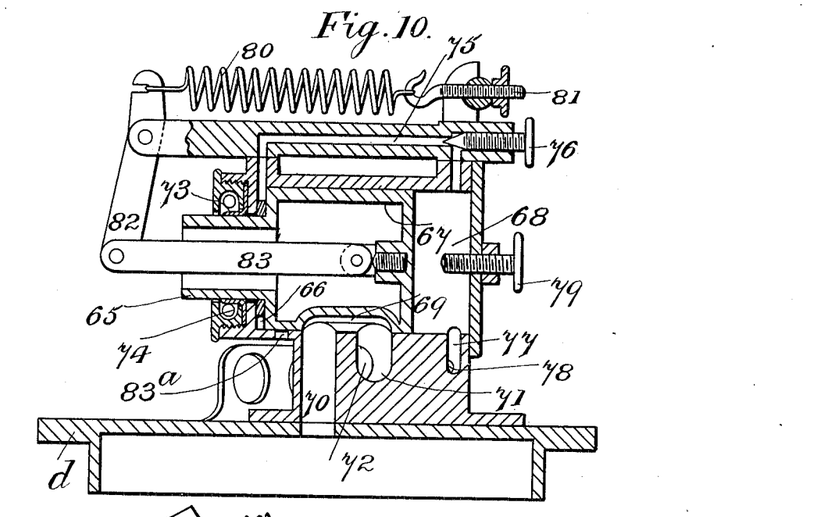
Figs. 10 to 12 show a second construction of the apparatus, Fig. 10 being a longitudinal section, Fig. 11 a part end elevation, and Fig. 12 a part plan thereof.
Figure 11:
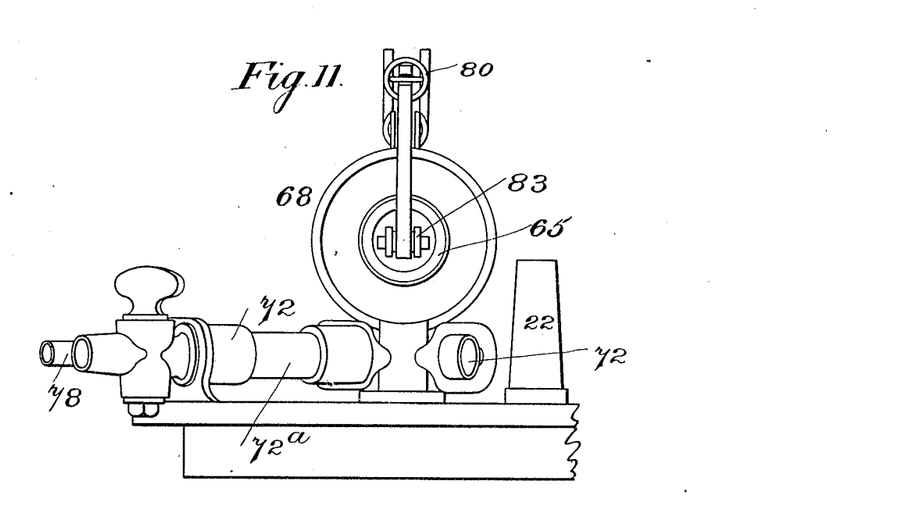
Figure 12:
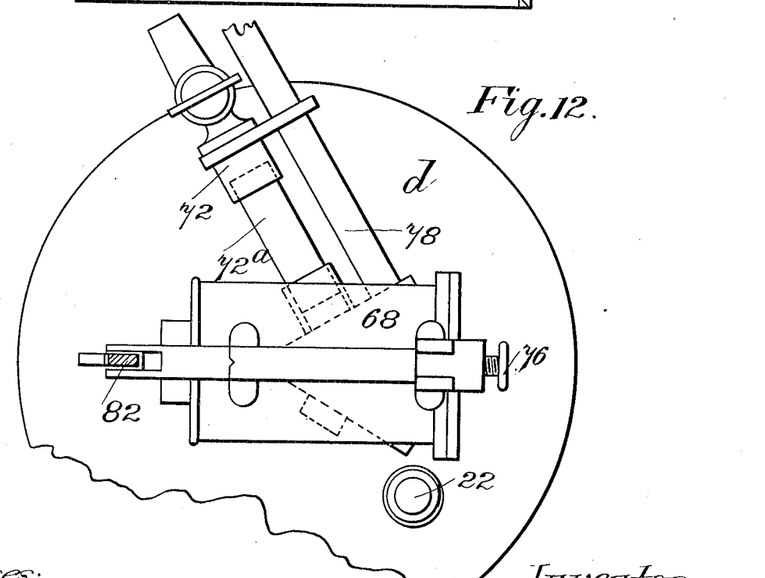

Under the method No. 3 I prefer to use a modification of the differential type of pulsating piston or valve, as shown in Figs. 1, 2, 3, 4 of United States Patent No. 642,044, of 1900. The modification in one form is illustrated in Figs. 10, 11, and 12, and like the apparatus in Patent No. 642,044 has an elongated piston or valve with two different diameters or sectional areas. The lesser diameter 65, which for convenience will be called the "primary area," is constantly exposed to atmospheric pressure. The annular surface 66, formed by the junction of the lesser and greater diameters, may be termed the "secondary area." The larger diameter 67 is fitted approximately air-tight into the cylinder 68, in which it has a limited axial movement, and the cavity 69 forms a valve for operating the port 70, leading to the milk-receiver, and the port 71, leading to the teat-cups by way of the pipe connection 72. The lesser diameter 65 of the piston passes through the cylinder end, in which it is made to work air-tight by means of a flanged leather 73, surrounded by an endless spiral spring 74 or a ring of elastic material. A passage 75, furnished with a regulator screw or valve 76, connects the two ends of the cylinder 68, and another port or passage 77 leads to the branch 78, which leads to the claw and teat-cups. A screw 79 in the cylinder-cover serves as a stop to limit the travel of the piston 67; and a spring may be interposed between the screw and the piston. The spring 80, which is furnished with a screw adjustment 81, acts upon the lever 82 and connecting-rod 83, which is jointed to the piston 67, and keeps the latter normally in the position shown in Fig. 10. The claw or junction-piece for the teat-cups used with this apparatus and under this method is of the type shown in Figs. 8 and 23, according to whether single or double chambered teat-cups are being employed. When this apparatus is used in combination with double-chambered teat-cups, the branch 72 of the pulsator is connected to the milk-conductor 29 of the claw, Fig. 8, and the branch 78 with the air-conductor 28, the branches 32 33 of the claw being connected to the teat-cups. 72ª is a glass inspection-tube.

Figure 13:
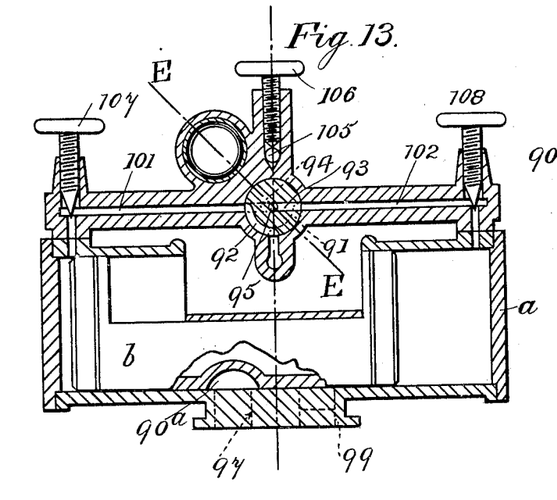
Figs. 13 to 16 show a third construction of the apparatus, Fig. 13 being a longitudinal section, Fig. 13$^a$ a diagonal section on the line E E, Fig. 13, of part of the apparatus, Fig. 14 a transverse section, Fig. 15 a side elevation, and Fig. 16 a plan of part of the lower part of the apparatus.
Figure 13A:
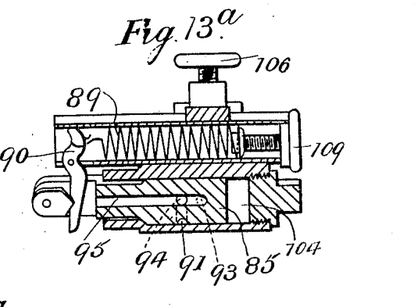
Figure 14:
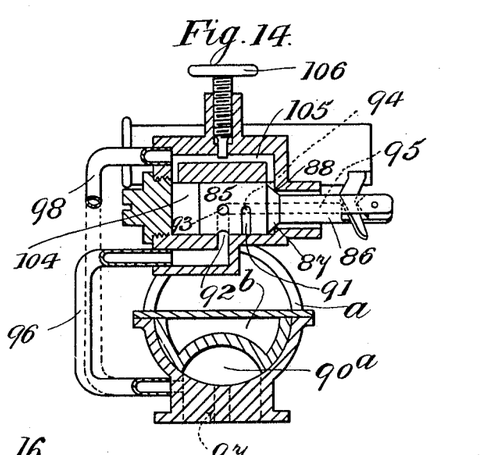
Figure 15:
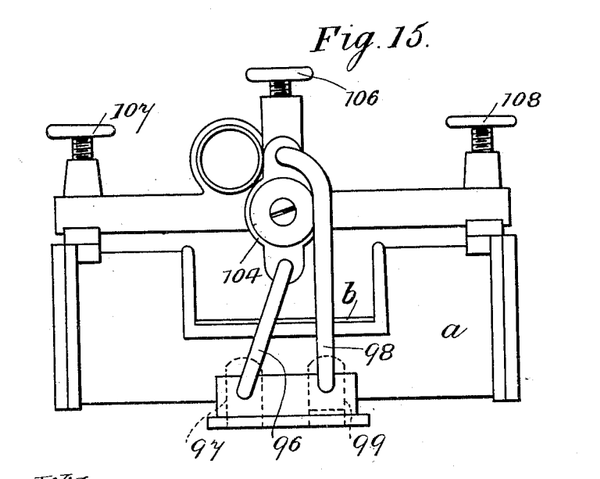
Figure 16:
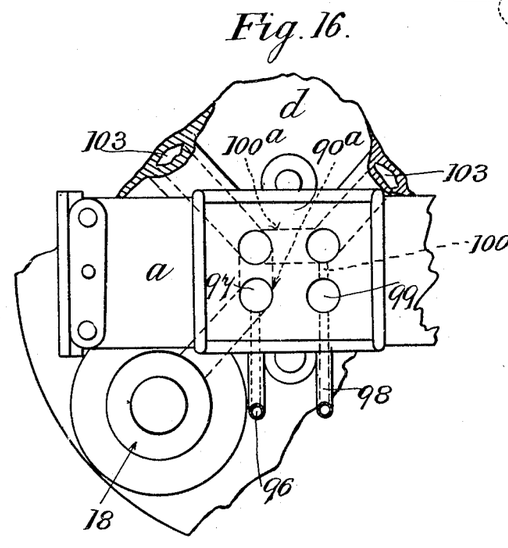
Figure 23:
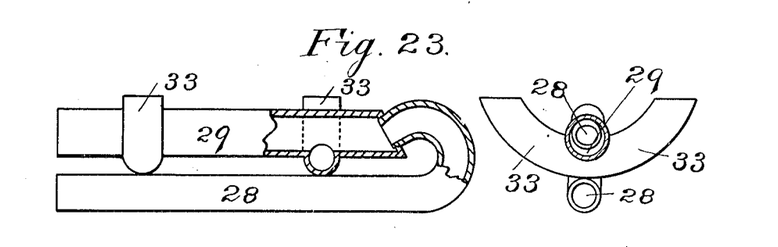
Fig. 23 is a part side elevation and part section and an end view of another claw.

The operation of milking is as follows: The machine being placed on a milk-receptacle in which a partial vacuum is formed, the vacuum has access by the passage 70, the valve-cavity 69, the port 71, branch 72, and conductor 29 of the claw, Fig. 8, to the teat-cups and also from the conductor 29, by the passage 34, air-conductor 28, the branch 78, port 77, and passage 75, to each end of the pulsator-cylinder 68. When the vacuum in this cylinder 68 has reached a predetermined degree, depending on the tension of the spring 80, the piston or valve 67 will by the atmospheric pressure on the projecting lesser diameter or primary area 65 be sucked against the action of the spring 80 into the cylinder 68. By this movement the vacuum-supply to the teat-cups through ports 70 and 71 is gradually cut off, while at the same time the aperture 83ª in the cylinder, which was formerly closed by the piston, is gradually opened. This makes the atmospheric pressure effective on what is termed the "secondary area" 66, formed by the junction of the lesser and greater diameters of the piston, with the result that it is forced against the stop 79, in which position the vacuum-supply through 70 is either partially or entirely cut off. In this position the air entering by hole 83ª can pass at back of piston 66, along passage 75, front of piston 67, port 77, pipe 78, and conductor 28 to the teat-cups, thereby reducing the vacuum therein. When the vacuum is so much reduced that the atmospheric pressure on the lesser diameter 65 in conjunction with the remaining vacuum in the teat-cups and cylinder 68 is no longer capable of withstanding the reaction of the spring 80, the piston 67 is pulled back again to its normal position. These piston movements repeat themselves automatically at a rate depending upon the areas of the respective milk and air passages 72 and 45 and in accordance with the fluctuations of the vacuum in the teat-cups. For use with single-chambered teat-cups a claw, such as shown at Fig. 23, may be employed. In this claw the milk-conductor 29 has the air-conductor 28 made as an extension, the end of the air-pipe being bent round into the back of the milk-pipe. No valve is used; but the junction between 28 and 29 is preferably contracted. This differential-area piston device may in a modified form be made to actuate the pulsator piston or valve described in United States Letters Patent No. 756,245 and be applied to the apparatus described under the method No. 1 of this patent. The apparatus is illustrated in detail in Figs. 13 to 16. In Figs. 13 and 14 the differential piston or valve 85 is at the junction of its lesser and greater diameters 86 85 formed as a valve 87, which closes against the seat 88 under the influence of the spring 89 and lever 90. The large diameter or body 85 has in it two cavities 91 92 and two holes 93 94, which communicate with the passage 95 in the center of the valve and which is open at one end to the atmosphere. The pipe 98 is connected to the passage 97, which communicates with the vacuum-supply, while the pipe 96 is connected to the blind port 99, (see Fig. 16,) and indirectly (by the connecting-passage 100$^a$ and ports 103) to the teat-cups through an aperture of restricted area 100. In the normal position of the valve 87 the cavity 92 connects the passage 101, (see Fig. 13,) leading to one end of the pulsator-cylinder $a$, with the vacuum-supply pipe 96, while the hole 93 connects the passage 102, leading to the other end of the pulsator-cylinder, to the atmosphere through the passage 95, thereby moving the pulsator-piston $b$ into the position shown at Fig. 13. In this position the vacuum from the port 97 has also access to the teat-cups through the cavity 90$^a$, passage 100$^a$, ports 103, and connections, and, further, through the passage 100 and pipe 98 to the valve-chest 104. When the vacuum in the chest 104 and passage 105 has reached such a degree that the air-pressure on the valve portion 87 of the piston overcomes the resistance of the spring 89, air will be admitted at the seat 88 and become effective on the larger area of the piston, with the result that it will drive it to its extreme inward position. In this position the cavity 91 connects the passage 102 with the vacuum-supply pipe 96 and the holes 94 95 connect the passage 101 with the air-supply, thereby moving the pulsator-piston $b$ to the opposite end of the cylinder $a$. This cuts off the vacuum-supply from the teat-cups, and at the same time the air entering at 88 passes along the passage 105 by the pipe 98 to the teat-cups, thereby reducing the vacuum therein. When the vacuum has fallen so much that the reaction of the spring is greater than the effective air-pressure on the piston 85 86, the valve 87 will return to its normal position and cut off the air-supply, with the result that the pulsator-piston $b$ will also return to its normal position. These movements can be timed by the regulators 106, 107, 108, and the spring adjustment 109.

In connection with the foregoing apparatuses I prefer to use inspection devices of improved construction. A separate inspection device is preferably used in conjunction with each set of teat-cups.

Figures 19, 21:
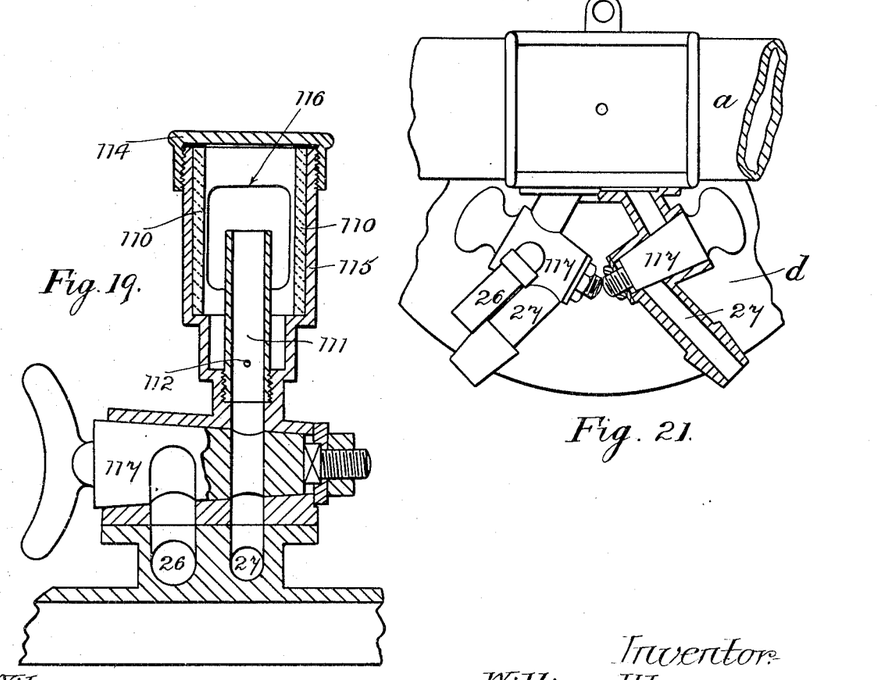
Fig. 19 is a vertical section of an inspection device and arrangement.
Fig. 21 is a plan of Fig. 20.

The special feature of the inspection devices shown in Figs. 6, 7, and 19 is that the transparent portion 110, which may be of tubular or of bell-shape form, is placed vertically, and the passages for the milk are so arranged that so long as milk is flowing at a certain rate from the teat-cups to the milk-receptacle the milk-level, as seen in the transparent portion, remains approximately constant; but as soon as the flow of milk falls below a certain rate the level of the milk falls, thereby indicating a reduction in quantity or a complete cessation of the flow. Under this part of the invention I fit a vertical tubular stem or stud 111 in the center of the device, and I arrange outside of it a glass tube or cylinder 110. At the lower end of the stem or stud a hole 112 of restricted area is made, and this hole constitutes a short circuit or by-pass for the milk. 113, Fig. 6, represents holes made near the top of the stem for the passage of the milk. The glass cylinder 110 is secured in place by means of the screw-cap 114, which screws upon the upper end of the stem. In the arrangement Fig. 19 the glass cylinder 110 is inclosed within a metal case 115, having apertures 116 in it, one at each side. The screw-cap 114 screws on top of the metal casing. 117 is the cock, with passages therein communicating with the nozzles 26 27. If desired, the case 115 may be substituted by a spiral spring, so as to secure the ends of the glass cylinder 110 against the joints at both ends with even pressure. With these devices the arrangement is such that the milk on its passage from the teat-cups flows in by the branch 27 and up between the glass 110 and the stem 111 till it reaches the holes 113, Fig. 6, or the top of the stem, Fig. 19, when it enters the stem and passes to the milk-receptacle through the cock 117. When the milk is standing in the glass 110 up to the top of the stem or to the holes therein, it is easily visible. When the milk ceases to flow or is much reduced in quantity, the level of the milk in 110 of course falls and any little milk there may be passing runs away through the hole 112. When the milk increases to such an extent that the hole 112 will not suffice to carry it off, it of course rises in the glass 110.

Figure 20:
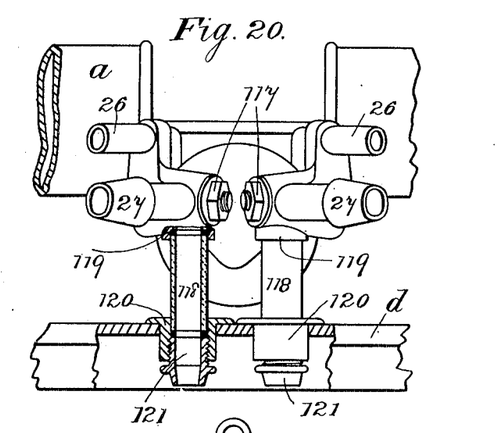
Fig. 20 is a front view, with part in section, of another form of inspection device and arrangement.

In the arrangement Figs. 20 and 21 tubular inspection-glasses 118 are fitted below the cocks 117, being inserted in sockets 119 at their upper ends and into tubular pieces 120, which are fitted in the cover *d*. Screwed into the tubular pieces 120 are nozzles 121, by means of which the glasses can be jammed up tight.

Figures 24, 25, 26, 27, 28, 29:
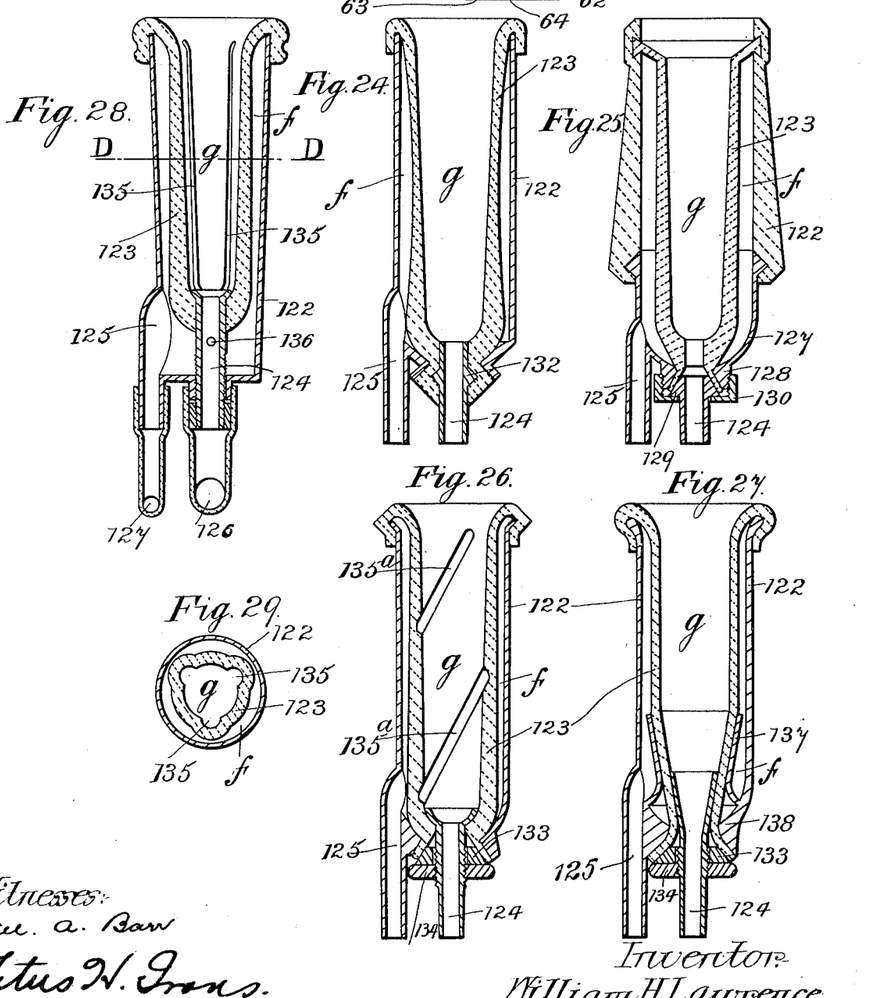

The teat-cups illustrated in Figs. 24, 25, 26, 27, 28, and 29 are of the double-chambered type and comprise an outer case 122 and an inner lining 123, which form the two chambers *f g*, and in connection with the inner chamber there is a nozzle 124 and with the outer chamber a nozzle 125, and by means of these nozzles and flexible tubes 126 127 connection is made with the respective milk and air branches of the junction-pieces or claws. Fig. 25 is representative of the A class of teat-cup before referred to and comprises the outer flexible case 122, (which is made of india-rubber or other suitable flexible material and of the shape shown,) the inner flexible lining 123, (which is made of india-rubber or other suitable flexible material and of the shape shown and preferably is adapted at its upper end to dovetail into the case 122,) and the metal or other cup end or junction 127, made with the nozzle 125 and the screwed end 128, which latter is coned at its interior, and is adapted to receive the lower end or extension of the flexible lining 123. The nozzle 124 has a conic end 129, and by screwing the cap 130 on the part 128 the cone 129 can be made to pinch the lower end or extension of the flexible lining against the part 128, and thereby secure it tightly in place and also isolate the two chambers. The upper end of the flexible lining 123 is shown dovetailed into the outer case.

Figs. 24, 26, 27, 28, and 29 show representative illustrations of the B class of teat-cups and comprise an outer rigid case 122 and inner elastic lining 123. The wall of this lining, as shown in Figs. 24, 26, and 28, is suitably graduated in thickness, so as to produce a progressive expansion and contraction of the lining when under the influence of the variations of vacuum or presure effected in the respective chambers by the pulsating apparatus. The lining for this form of teat-cup is molded to suitable shape for attachment to the outer case. In Fig. 24 the lower end of the lining 123 is molded so as to fit elastically on the nozzle 124, which is provided with a V-shaped circumferential bead 132. The extreme lower end of the outer rigid case is first contracted and then expanded, so as to correspond with the bead 132. The lower end of the lining is held air-tight between the nozzle and the outer case.

In Figs. 26 and 27 cones 133 are adapted to fit onto the nozzles 124 and are forced upward, so as to expand and tightly jam the lower ends of the linings 123 against the conic bottom ends of the case 122, as shown. 134 represents screw-nuts for forcing up the cones and which work on the nozzles.

The walls of the lining 123 may be provided with grooves or flutes 135, Fig. 28, running lengthwise of or spirally around the lining. In Fig. 26 spiral or oblique grooves are shown at 135ª. Fig. 28 also shows an arrangement for extending the inner lining downward by means of the screwed nozzle 124 for the purpose of contracting the lining internally, and thereby increasing its resilience. A small aperture 136 may be provided in the nozzle for allowing a limited amount of air to pass from the outer chamber *f* to the inner chamber *g* at the period when the pressure is highest in the outer chamber, so as to assist the flow of milk from the inner chamber to the milk-receptacle.

Fig. 27 shows an arrangement in which a plain tubular elastic lining 123 is employed, and this lining is contracted by being drawn through the conical rigid sleeve 137 and also through the false bottom or waist 138 of the outer case and is again expanded by the cone 133 and nut 134 working on the screwed part of the nozzle 124. At its upper end the lining may be simply folded over the outer case.

The connection between the teat-cups, junction-pieces, or claws and the pulsating device is made by means of flexible tubes, as usual.

Having now fully described my invention, what I claim, and desire to secure by Letters Patent, is—

1. In milking apparatus the combination with a teat-cup having a milk-chamber and an air-chamber, means for exhausting air from both said chambers, means for varying the degree of air exhaustion in the air-chamber, means for regulating the degree of air exhaustion in the milk-chamber, and means for admitting air intermittently from the air-chamber to the milk-chamber of the teat-cup.

2. In milking apparatus, the combination with a milk-receptacle and a teat-cup having a milk-chamber and an air-chamber of means for connecting the teat-cup to the milk-receptacle, means for exhausting air from both said teat-cup chambers, means for varying the degree of air exhaustion in the air-chamber, means for regulating the degree of air exhaustion in the milk-chamber and the milk-receptacle, and means for admitting air intermittently from the air-chamber to the milk-chamber of the teat-cup.

3. In milking apparatus, the combination with a teat-cup having milk and air chambers, of means for exhausting air from both said chambers and means for varying the degree of air exhaustion in both the chambers.

4. In milking apparatus the combination with a teat-cup having milk and air chambers, of means for exhausting air from both said chambers and means for periodically varying the degree of air exhaustion in both the chambers.

5. In milking apparatus, the combination with a teat-cup having milk and air chambers, of means for exhausting air from both said chambers and means for varying synchronously the degree of air exhaustion in both the chambers.

6. In milking apparatus, the combination with a teat-cup having milk and air chambers, of means for exhausting air from both said chambers, and means for varying periodically the degree of air exhaustion in both the chambers the periodic variations in the one chamber alternating with those in the other chamber.

7. In a milking apparatus, the combination with a teat-cup having milk and air chambers, of means for exhausting air from both said chambers and automatic means for varying the degree of air exhaustion in both the chambers.

8. In milking apparatus, the combination with a teat-cup having milk and air chambers, of means for exhausting air from both said chambers and pneumatically-operated means for varying the degree of air exhaustion in both the chambers.

9. In milking apparatus, the combination with a teat-cup having milk and air chambers of means for exhausting air from both said chambers, means for varying the degree of air exhaustion in the air-chamber and means for cutting off the suction from the milk-chamber periodically and in synchronism with the variations of pneumatic pressure in the air-chamber.

10. In milking apparatus, the combination with a teat-cup having milk and air chambers, of means for exhausting air from both said chambers, means for varying the degree of air exhaustion in the air-chamber, and means for partially cutting off the suction from the milk-chamber periodically and in synchronism with the variations of pneumatic pressure in the air-chamber.

11. Apparatus for milking cows by pneumatic pulsating means working in conjunction with teat-cups having milk-chambers and air-chambers, comprising, in combination, a milk-receptacle, a valve for effecting variations of vacuum or pneumatic pressure in the air-chambers of the teat-cups, means for regulating the degree of vacuum in the milk-chambers of the teat-cups and the milk-receptacle, and a valve for admitting air intermittently from the air to the milk-chambers of the teat-cups to assist the flow of milk to the milk-receptacle, substantially as described.

12. Apparatus for milking cows by pneumatic pulsating means working in conjunction with teat-cups having milk-chambers and air-chambers, comprising, in combination, a milk-receptacle, a pulsator for effecting variations of vacuum or pneumatic pressure in the air-chambers of the teat-cups, means for regulating the degree of vacuum in the milk-chambers of the teat-cups and the milk-receptacle, means for supplying air to the air-chambers of the teat-cups, a claw having air and milk conductors connected with the teat-cups, a valve having a convex face and a piston portion which works within a cylindrical casing connected with the milk-conductor of the claw by a restricted passage and with the air-conductor by an opening which can be closed by the said convex portion of the valve, substantially as described.

13. Apparatus for milking cows by pneumatic pulsating means working in conjunction with teat-cups having milk-chambers and air-chambers comprising, in combination, a milk-receptacle, a pulsator for effecting variations of vacuum or pneumatic pressure in the air-chambers of the teat-cups, means for regulating the degree of vacuum in the milk-chambers of the teat-cups and the milk-receptacle and a double-seated valve for admitting air to the air-chambers of the teat-cups either from the atmosphere or from the milk-receptacle, substantially as described.

14. Apparatus for milking cows comprising, in combination, a base made with vacuum and air ports therein and capable of fitting on the milk-pail, a pulsator fitted on the base, a pulsator-valve having a cavity therein, a vacuum-reducing valve, an air-admission valve, milk and air conduits, an inspection device, means for opening or closing the milk and air conduits, and double-chambered teat-cups, substantially as described.

15. Apparatus for milking cows by pneumatic pulsating means working in conjunction with teat-cups, having milk-chambers and air-chambers, comprising, in combination, a milk-receptacle, a pulsator for effecting variations of vacuum or pneumatic pressure in the air-chambers of the teat-cups, means for regulating the degree of vacuum in the milk-chambers of the teat-cups and the milk-receptacle, means for supplying air to the air-chambers of the teat-cups, a claw having air and milk conductors, teat-cups connected with the claw, and an automatically-acting valve on the claw for admitting air to the milk-conductor in order to assist the flow of the milk, substantially as described.

16. Apparatus for milking cows by pneumatic pulsating means working in conjunction with teat-cups having milk-chambers and air-chambers, comprising, in combination, a milk-receptacle, a pulsator for effecting variations of vacuum or pneumatic pressure in the air-chambers of the teat-cups, means for regulating the degree of vacuum in the milk-chambers of the teat-cups and the milk-receptacle, means for supplying air to the air-chambers of the teat-cups, a claw having air and milk conductors connected with the teat-cups, a spring-loaded valve having a convex face which is arranged in connection with the air-conductor and allows a restricted amount of air to pass from the atmosphere to the milk-conductor, substantially as described.

17. Apparatus for milking cows comprising, in combination, a milk-pail, a base made with vacuum and air ports therein and capable of fitting on the milk-pail, a pulsator fitted on the base, a pulsating piston having a cavity therein, a vacuum-reducing valve, an air-admission valve, milk and air conduits, a double cock for the conduits, an overflow-inspection device having a transparent portion arranged vertically above said double cock, means for opening and closing the milk and air conduits, and double-chambered teat-cups, substantially as described.

18. In milking apparatus, the combination with a teat-cup having milk and air chambers, of means for exhausting air from both said chambers, valves for varying the degree of air exhaustion in both the chambers, and means for operating the valves, substantially as described.

19. In milking apparatus, the combination with a teat-cup having milk and air chambers, of means for exhausting air from both said chambers, a reciprocating valve, a second reciprocating valve, and means for operating these valves, substantially as described.

20. In milking apparatus, the combination with a teat-cup having milk and air chambers, of means for exhausting air from both said chambers, a reciprocating valve, a second reciprocating valve connected with the first valve and operated therefrom, and means for operating the first valve, substantially as described.

21. The combination with a teat-cup having a milk-chamber and an air-chamber, a milk-pipe connected with the milk-chamber, a pipe connected with the air-chamber, a claw having a milk-conductor and an air-conductor connected respectively with said pipes, a pulsator, air and milk pipes connecting the pulsator with said claw, and means for operating the pulsator, substantially as described.

22. The combination with a teat-cup having a milk-chamber and an air-chamber, a milk-pipe connected with the milk-chamber, a pipe connected with the air-chamber, a claw having a milk-conductor and an air-conductor connected respectively with said pipes, a reciprocating valve for alternately exhausting air from and admitting air to the pipe leading to the air-chamber, a reciprocating valve for alternately exhausting air from and admitting air to the pipe leading to the milk-chamber, and means for operating these valves, substantially as described.

23. The combination with a teat-cup having a milk-chamber and an air-chamber, a milk-pipe connected with the milk-chamber, a pipe connected with the air-chamber, a claw having a milk-conductor and an air-conductor connected respectively with said pipes, a reciprocating valve for alternately exhausting air from and admitting air to the pipe leading to the air-chamber, a reciprocating valve for alternately exhausting air from and admitting air to the pipe leading to the milk-chamber, means for operating said valves, and means for regulating the degree of air exhaustion in the pipes leading to the teat-cup chamber, substantially as described.

24. The combination with a teat-cup having a milk-chamber and an air-chamber, a pipe connected with the milk-chamber, a pipe connected with the air-chamber, a claw having a milk-conductor and an air-conductor connected respectively with said pipes, a reciprocating valve for alternately exhausting air from and admitting air to the pipe leading to the air-chamber, a reciprocating valve for alternately exhausting air from and admitting air to the pipe leading to the milk-chamber, means for operating said valves, and automatically-acting valves for regulating the degree of air exhaustion in the pipes leading to the teat-cup chambers, substantially as described.

25. The combination with a teat-cup having a milk-chamber and an air-chamber, a pipe connected with the milk-chamber, a pipe connected with the air-chamber, a claw having a milk-conductor and an air-conductor connected respectively with said pipes, a reciprocating valve for alternately exhausting air from and admitting air to the pipe leading to the air-chamber of the teat-cup, a reciprocating valve for alternately exhausting air from and admitting air to the pipe leading to the milk-chamber of the teat-cup, and means for operating these valves simultaneously and in opposite directions so that when air is being exhausted from the air-chamber it is being admitted to the milk-chamber of the teat-cup and vice versa, substantially as described.

26. The combination with a teat-cup having a milk-chamber and an air-chamber, a pipe connected with the milk-chamber, a pipe connected with the air-chamber, a claw having a milk-conductor and an air-conductor connected respectively with said pipes, a pulsator, air and milk pipes connecting the pulsator with said claw, an automatically-acting air-admission valve in the claw, and means for operating the pulsator, substantially as described.

27. The combination with a teat-cup having a milk-chamber and an air-chamber, a pipe connected with the milk-chamber, a pipe connected with the air-chamber, a claw having a milk-conductor and an air-conductor connected respectively with said pipes, a pulsator, air and milk pipes connecting the pulsator with said claw, a duplex air-admission valve in the claw and means for operating the pulsator, substantially as described.

28. The combination with a teat-cup having a milk-chamber and an air-chamber, a pipe connected with the milk-chamber, a pipe connected with the air-chamber, a claw having a milk-conductor and an air-conductor connected respectively with said pipes, a pulsator, air and milk pipes connecting the pulsator with said claw, a pneumatically-operated air-admission valve in the claw, said valve having two areas the larger area open to the atmosphere and the smaller area to the vacuum-space of the milk-conductor of the claw, and means for operating the pulsator, substantially as described.

29. In milking apparatus, the combination with a teat-cup having a milk-chamber and an air-chamber, of means for exhausting air from both said chambers, combined pneumatic and mechanical means for varying the degree of air exhaustion in the air-chamber and means for cutting off the suction from the milk-chamber periodically and in synchronism with the variations of pneumatic pressure in the air-chamber, substantially as described.

30. In milking apparatus, the combination with a teat-cup having a milk-chamber and an air-chamber, of means for exhausting air from both said chambers, means for varying the degree of air exhaustion in the air-chamber, a valve for cutting off the suction from the milk-chamber periodically and in synchronism with the variations of pneumatic pressure in the air-chamber, and combined pneumatic and mechanical means for operating said valve, substantially as described.

31. In milking apparatus, the combination with a teat-cup having a milk-chamber and an air-chamber, of means for exhausting air from both said chambers, a reciprocating valve for varying the degree of air exhaustion in the air-chamber and cutting off the suction from the milk-chamber periodically and means for operating said valve, substantially as described.

32. In milking apparatus, the combination with a teat-cup having a milk-chamber and an air-chamber, of means for exhausting air from both said chambers, a reciprocating valve for varying the degree of air exhaustion in the air-chamber and cutting off the suction from the milk-chamber periodically, and pneumatic means for operating the valve in one direction and mechanical means for operating the valve in the other directions, substantially as described.

33. In milking apparatus, the combination with a teat-cup having a milk-chamber, and an air-chamber, of means for exhausting air from both said chambers, a reciprocating valve for varying the degree of air exhaustion in the air-chamber and cutting off the suction from the milk-chamber periodically and in synchronism with the variations of pneumatic pressure in the air-chamber, and means for operating said valve, substantially as described.

34. In milking apparatus, the combination with a teat-cup having a milk-chamber and an air-chamber, of means for exhausting air from both said chambers, a reciprocating differential piston-valve with a cavity therein for varying the degree of air exhaustion in the air-chamber and cutting off the suction from the milk-chamber periodically, a valve-casing with milk-passages and air-passages, pneumatic means for operating the valve in the one direction, and a spring for operating the valve in the other direction, substantially as described.

35. In milking apparatus, the combination with a teat-cup having a milk-chamber and an air-chamber, of means for exhausting air from both said chambers, a reciprocating differential piston-valve with a cavity therein for varying the degree of air exhaustion in the air-chamber and cutting off the suction from the milk-chamber periodically, a claw connected with the teat-cup and having an air-conductor and a milk-conductor the air-conductor communicating with the milk-conductor, a valve-casing with milk-passages and air-passages, pneumatic means for operating the valve in the one direction, and a spring for operating the valve in the other direction, substantially as described.

36. Apparatus for milking cows by pneumatic pulsating apparatus working in conjunction with teat-cups having milk-chambers and air-chambers, comprising, in combination, a milk-receptacle, a pulsator-valve for effecting variations of vacuum or pneumatic pressure in the air-chambers of the teat-cups, an automatically-acting differential valve for controlling the movements of the pulsator-valve and for supplying air to the air-chambers of the teat-cups, means for regulating the degree of vacuum in the milk-chambers of the teat-cups and the milk-receptacle, and means for operating the pulsator-valve, substantially as described.

37. Apparatus for milking cows by pneumatic pulsating apparatus working in conjunction with teat-cups having milk-chambers and air-chambers, comprising, in combination, a milk-receptacle, a pulsator-valve for effecting variations of vacuum or pneumatic pressure in the air-chambers of the teat-cups, an automatically-acting differential valve for controlling the movements of the pulsator-valve, combined pneumatic and mechanical means for operating said controlling-valve, means for intermittently admitting air to the air-chambers of the teat-cups, means for regulating the degree of vacuum in the milk-chambers of the teat-cups and the milk-receptacle, and means for operating the pulsator-valve, substantially as described.

38. In milking apparatus, a double-chambered teat-cup having, in combination, an outer flexible case, an inner flexible lining, a cup end with air-nozzle thereon, and a cone arrangement for securing the bottom of the inner lining tightly in position in the said cup end, substantially as described.

39. In milking apparatus, a double-chambered teat-cup having, in combination, an outer case with reduced lower end having a conic extension, an inner flexible lining, a nozzle with expanded upper end fitted in the lining and means for forcing the lower end of the inner lining tightly against the conic extension of the outer case, substantially as described.

40. In milking apparatus, a double-chambered teat-cup comprising, in combination, an outer case, an inner elastic lining, and means for increasing the resilience of the elastic lining by extending it lengthwise, substantially as described.

Signed at Glasgow, in the county of the city of Glasgow, Scotland, this 27th day of April, 1904.

WILLIAM HENRY LAWRENCE.

Witnesses:
HENRY LEARMONT,
ALEXANDER CHISHOLM.